United States Patent [19]

Dorsch et al.

[11] 4,318,457
[45] Mar. 9, 1982

[54] WEAR WARNING INDICATORS FOR FRICTION BRAKES

[75] Inventors: Erich G. Dorsch, Koblenz; Dietrich Holz, Lahnstein, both of Fed. Rep. of Germany

[73] Assignee: Lucas Industries Limited, Birmingham, England

[21] Appl. No.: 127,430

[22] Filed: Mar. 5, 1980

[30] Foreign Application Priority Data

Mar. 5, 1979 [GB] United Kingdom ............... 7726/79

[51] Int. Cl.³ ............................................. F16D 66/02
[52] U.S. Cl. ................................. 188/1.11; 340/52 A
[58] Field of Search .................... 116/208; 188/1 A; 340/52 A

[56] References Cited

U.S. PATENT DOCUMENTS

| 3,674,114 | 7/1972 | Howard | 188/1 A |
| 3,716,113 | 2/1973 | Kobayashi et al. | 188/1 A |
| 3,783,979 | 1/1974 | Hess . | |
| 4,124,105 | 11/1978 | Maehara | 188/1 A |

FOREIGN PATENT DOCUMENTS 1424769 2/1976 United Kingdom ............... 188/1 A

Primary Examiner—Duane A. Reger
Attorney, Agent, or Firm—Scrivener, Clarke, Scrivener and Johnson

[57] ABSTRACT

A sensor device, for fitting to, for example, a drum brake shoe includes a loop of wire which can electrically contact the drum to provide a signal to indicate wear. After a predetermined amount of wear of the shoe lining, the wire contacts the drum on each brake application to provide an intermittant warning signal. When the lining becomes dangerously worn, the loop is severed and the ends spring apart so as to maintain contact with the drum and provide a continuous signal. The wire is mounted in a housing of plastics or of sheet metal, which may be a snap-fit in to the shoe structure.

7 Claims, 6 Drawing Figures

WEAR WARNING INDICATORS FOR FRICTION BRAKES

This invention relates to a friction pad or shoe assembly including a warning indicator for providing a signal when the friction material of the assembly has worn a predetermined amount.

It is known to embed in the friction material of brake pads an electrical sensor which, as the pad wears, engages the rotor during brake application to complete an electrical circuit and provide a visual or audible indication that the pad is worn. Such sensors are normally actuated only intermittently, i.e. during brake application. However, an electrical latching means may be provided in the circuit, to retain the signal after the sensor moves clear of the rotor. However, extra circuitry must be provided to do this, and to enable the latching means to be reset following replacement of the material. Apart from the expense, complexity of this sort is undesirable since it reduces the reliability of an indicator in which reliability is very important since it only operates very infrequently.

In other known assemblies it has been proposed to embed in the friction material an electrical wire which is connected in a circuit with a warning lamp so arranged that the lamp glows when the electrical circuit is broken when the wire is completely severed by contact with the rotor when the pad has worn.

The aim of the invention is to provide an improved brake pad or shoe assembly.

In accordance with the invention, there is provided a brake friction pad or shoe assembly having friction material for engagement with a brake rotor, said assembly including an electrical wear warning indicator comprising a length of electrically conductive wire which is arranged to contact the brake rotor when there is sufficient wear of the friction material so that when there is such wear the wire engages the rotor upon each brake application to provide an intermittent signal, and is arranged to sever when there is excessive wear of the friction material, at least one of the severed ends of the wire being resiliently urged into engagement with the rotor to provide a continuous signal.

A drum brake shoe assembly in accordance with the invention will now be described, by way of example, with reference in the accompanying drawings, in which.

Figure 1:
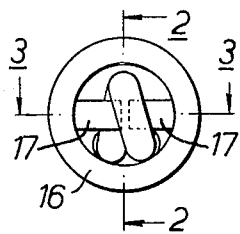
FIG. 1 is a plan of an electrical sensor device for a wear indicator of the pad assembly.
Figure 2:
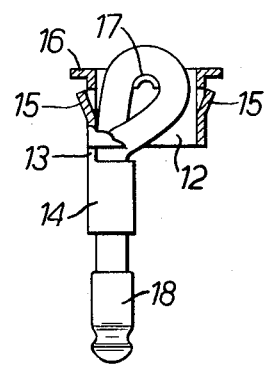
FIG. 2 is an elevation of the device shown in FIG. 1, partly sectioned along line 2—2 of FIG. 1.
Figure 3:
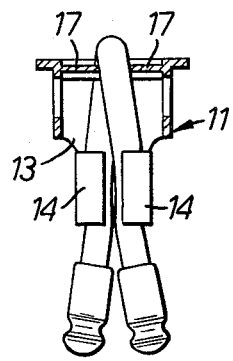
FIG. 3 is an elevation of the device shown in FIG. 1, partly sectioned along line 3—3 of FIG. 1.

The electrical sensor device shown in FIGS. 1 to 3 comprises a length of electrical wire 10, and a housing 11. The housing 11 is formed in sheet metal, which is bent into a cylinder 12, from which depends a tail 13, having tags 14. Barbs 15 are punched in the walls of the cylinder 12, the end of which is bent over to form a flange 16. Also bent inwards from the walls of the cylinder 12 are two curved platform arms 17. The length of wire 10 is insulated and is provided at each end with a suitable standard end connector in this case, a bullet 18 of a bullet-and-barrel connector. The wire 10 is formed into a loop, fitting over the platform arms 17, and retained to the housing 11 by the tags 14. There is no electrical contact between the wire 10 and the housing 11.

Figure 4:
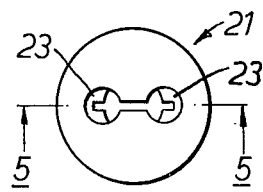
FIG. 4 is a plan of part of another sensor device.
Figure 5:
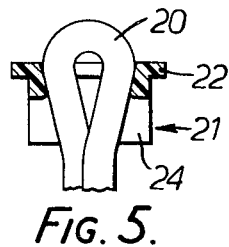
FIG. 5 is a section alone line 5—5 of the device shown in FIG. 4.

The device shown in FIGS. 4 and 5 comprises a loop of wire 20, and a housing 21. The housing is moulded in plastics material and includes a flange end 22, formed with holes 23, the axes of which converge. The holes 23 are of a size slightly smaller than the size of the wire to be inserted in them, and a skirt 24 of the housing 21 is split, to allow the holes to be expanded. Thus, when the loop of wire 20 is inserted in the holes, the split skirt 24 causes the housing 21 to grip the wire 20, and retain the wire in the housing. The ends of the loop of wire 20 may be provided with bullets (not shown). The device shown in FIG. 6 comprises a moulded plastic housing 30, a loop of wire 31, and a support 32. The support 32 is formed of electrically conductive sheet metal, and includes a blade 33 which forms an element of a Lucar (reg. Trade Mark) connector; a barbed portion 34; an abutment stop 35; tags 36; and a curved platform 37.

The loop of wire 31 is bent over the platform 37, and the tags 36 crimped so as to retain the wire to the support. The tags 36 are provided with points which, upon crimping, pierce the insulation of the wire, so as to form an electrical connection with the conductor of the wire 31.

The housing 30 has a cylindrical portion 38, formed with barbs 39 and an interrupted flange 40. The flange is interrupted in vertical (in FIG. 6) alignment with the barbs 39, for ease of moulding. The housing has a slotted aperture 41 formed in the end 42 of the housing.

The support 32, with the wire 31 attached, is inserted into the aperture 41, down to the abutment stops 35, and is retained therein by virtue of the barbed portion 34.

Figure 6:
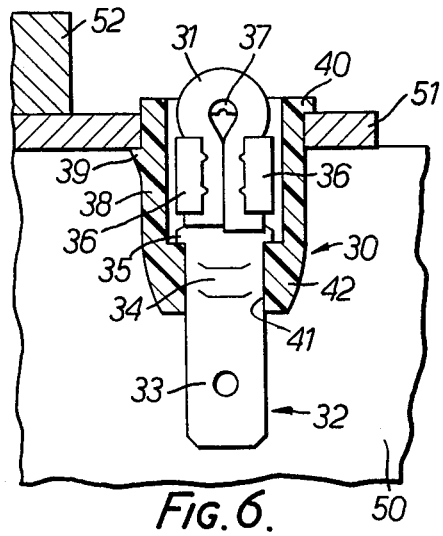
FIG. 6 is a section of a further sensor device, shown installed in the drum brake shoe.

All three devices shown are adapted to be fitted in an aperture formed in the structure on which the abradable material of a friction brake is carried. A drum brake shoe is an example of such a structure, and is illustrated in FIG. 6. The shoe comprises a metal web 50 and platform 51. A friction lining 52 is glued, riveted or otherwise attached to the platform 51.

The devices of, respectively, FIGS. 1 to 3, and FIG. 6 are retained in an aperture in the platform 51 by the flanges and barbs which are provided thereon, and the device of FIGS. 4 and 5 is retained by the resilience of its split skirt.

As the abradable material becomes worn out, each time the brake is actuated the wire touches the rotor of the brake. The insulation of the wire thus becomes scraped off, until the conductor is exposed, and it is arranged that contact between the rotor and the conductor is effective to actuate the wear warning signal. When the brake is released, the structure retracts, and the conductor breaks contact with the rotor.

At first therefore, the signal is intermittent, only being actuated when the brake is applied. It is intended that the driver responds to this, and repairs the brake. If he does not, and the abradable material continues to wear, the conductor becomes worn through, until finally, the wire is severed.

The severed ends thus produced now tend to spring apart by virtue of the inherent resilience of the wire, following from the fact that the wire was bent tightly into a loop. In separating the ends tend to move towards the rotor, far enough so that they remain in resilient contact with the rotor whilst the structure is moved towards and away from the rotor to actuate the brake. The signal therefore becomes continuous. The driver of the vehicle is thus warned, not only when the material is becoming worn, but also, by a distinctive signal, that it is becoming dangerously so.

It is sometimes the practice, with wear warning indicators, to provide means whereby a circuit testing function can be carried out. This usually involves passing a current through a sensor, which must therefore have a path through which the current can flow. The loops of wire in the first two devices illustrated already have separate ends, so that a current can pass along the loop. The ends of the loop in the third device however are joined, and they would need to be separated, and each to have its own connector, to allow a test current to be passed along the loop.

(a) no extra circuitry is required to latch the signal, since once the wire is worn through, an end of the wire is in contact with the rotor, whether the brake is actuated or not;

(b) it can be cheap to construct, since it requires no additional springs as the stress induced in a tight bend itself tends to make that bend open out when the material forming the bend is severed;

(c) the indicator is a convenient sub-assembly for easy production;

(d) the housing for the wear indicator of FIGS. 4 to 6 can be cheaply moulded into the required shape;

(e) the housing of FIGS. 1 to 3 is also cheap to produce, since sheet metal is easy to bend and punch.

(f) the indicator device is convenient in that it is easy to attach to and remove from the pad assembly so that if the assembly is replaced before the device is damaged, the device can easily be transferred and used again and, equally, a new device can be readily inserted;

(g) the indicator device can be produced as a convenient sub-assembly for easy production.

The above described assemblies are particularly suitable for use with drum brakes since drum brake shoe assemblies have an unlined portion, where the indicator device can be located, aligned with the braking path on the rotating drum.

We claim:

1. A brake friction pad or shoe assembly having friction material for engagement with a brake rotor, said assembly including an electrical wear warning indicator comprising a length of electrically conductive wire which is arranged to contact the brake rotor when there is sufficient wear of the friction material so that when there is such wear the wire engages the rotor upon each brake application to provide an intermittent electrical signal, and is arranged to sever when there is excessive wear of the friction material, at least one of the severed ends of the wire being resiliently urged into engagement with the rotor to provide a continuous electrical signal.

2. An assembly according to claim 1, wherein the wire is tightly bent into a loop, and is retained in the bent condition until being severed.

3. An assembly according to claim 1 or 2, wherein the inherent resilience of the wire is effective to cause the severed ends of the wire to spring towards the rotor.

4. An assembly according to claim 1 or 2, wherein the wire is mounted and retained in a housing.

5. An assembly according to claim 4, wherein the housing is a plastic moulding, shaped so as to receive and retain the wire.

6. An assembly according to claim 4, wherein the housing is formed in bent sheet metal, and in which the wire is held in the housing by clamping means forming part of the housing.

7. An assembly according to claim 4, in which the housing is adapted to be a snap fit into an aperture in the assembly.

* * * * *